Jan. 15, 1935. W. F. GELSDORF 1,987,899
CHARCOAL LIGHTER
Filed Oct. 16, 1931
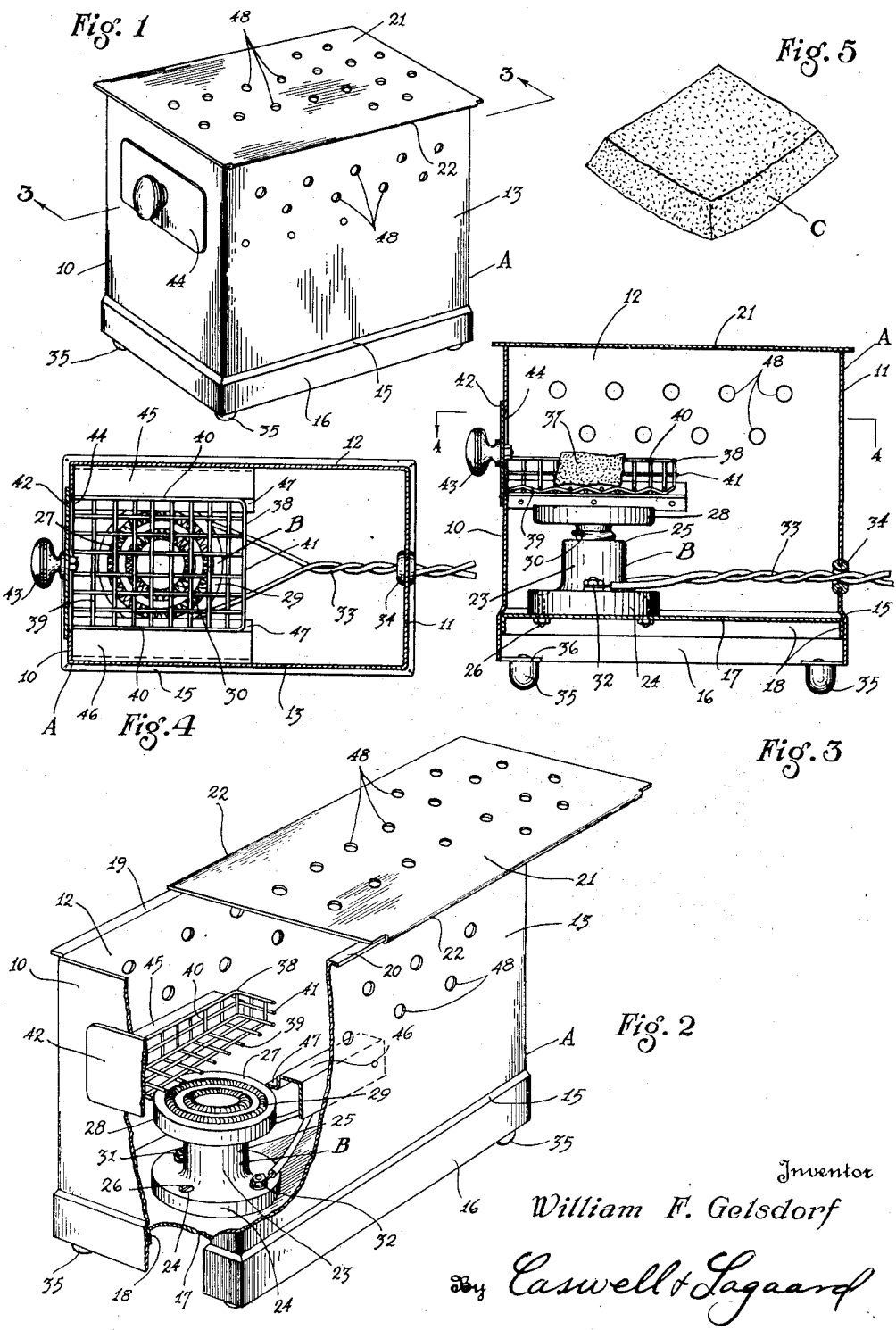
Inventor
William F. Gelsdorf
By Caswell & Lagaard
Attorneys Patented Jan. 15, 1935

1,987,899

UNITED STATES PATENT OFFICE 1,987,899

CHARCOAL LIGHTER

William F. Gelsdorf, Minneapolis, Minn.

Application October 16, 1931, Serial No. 569,273

1 Claim. (Cl. 44—35)

My invention relates to charcoal lighters and has for its object to provide a charcoal lighter in which charcoal used in religious ceremonies may be lighted without the accompanying dangers arising in the use of open flames.

Another object of the invention resides in providing a case having a heater therein and in employing a holder for the charcoal adapted to be moved into the case so as to bring the heater in heat conducting relation with respect to the charcoal contained within the holder.

A still further object of the invention resides in constructing the holder in the form of a tray having a perforate bottom upon which the charcoal rests and through which the heat passes in the lighting of the charcoal.

An object of the invention resides in constructing the bottom of the tray from metallic screen through which the heat from the heater is readily conducted.

Another object of the invention resides in constructing the case within which the heater is disposed with side and end walls and in forming in one of the end walls an opening through which the tray may be inserted into the case.

A still further object of the invention resides in attaching to the side walls, guides for slidably supporting the tray for movement into and out of the case.

A feature of the invention resides in installing the heater between said guides and in a position immediately below said tray so as to conduct heat readily to the charcoal within the same.

Another object of the invention resides in constructing the case open at the top and bottom and in providing a bottom for the case inset into the same and carrying said heater.

A feature of the invention resides in providing a closure for the top of the case adapted to expose the tray and heater.

Other objects of the invention reside in the novel combination and arrangement of parts and in the details of construction hereinafter illustrated and/or described.

In the drawing:

Fig. 1 is a perspective view of a charcoal lighter illustrating an embodiment of my invention.

Fig. 2 is a view similar to Fig. 1 with portions of the case and charcoal holder cut away and with the closure therefor partly removed to illustrate the internal construction of the lighter.

Fig. 3 is a vertical sectional view taken on line 3—3 of Fig. 1.

Fig. 4 is a plan sectional view taken on line 4—4 of Fig. 3.

Fig. 5 is a perspective view of a portion of charcoal used with the invention.

In the use of charcoal for lighting incense in religious services or for other occasions, considerable danger and risk from fire occurs where the charcoal is heated in the customary manner through an open flame. As the charcoal is held above such flame, fine dust is deposited from the charcoal upon the wick of the flame. When the flame is blown out, the charcoal upon the wick is blown from the same, which is usually in incandescent form, and frequently starts fires. With my invention, this is entirely prevented, the charcoal being completely concealed and enclosed during the lighting thereof and being lighted without the use of a flame.

My invention proper comprises a case which I have indicated at A which is open at the top and bottom thereof. This case includes two end walls 10 and 11 and two side walls 12 and 13 connected therewith. The case A may be constructed of sheet metal or may be in the form of a casting and the walls 10, 11, 12 and 13 may be integrally connected to one another or formed in parts and secured together in any desirable manner. The lower portion of the walls 10, 11, 12 and 13 form an offset 15 providing a base which I have indicated at 16 and which extends completely about said case. Within the base 16 is disposed a bottom 17 which may be constructed of sheet metal or other suitable material, if desired, and which in the form of the invention shown, is provided with downwardly extending flanges 18 by means of which the same may be spot welded, riveted or otherwise secured to the base 16.

For supporting the case A upon a table or other surface, four rubber feet 35 are employed which are adapted to be attached to ears 36 formed at the lower edges of the base 16 of the case A. These ears may be bent outwardly from the walls of the case or the same may be welded or otherwise secured thereto and are bent or attached to said structure after the bottom 17 has been applied thereto. The feet 35 may be secured to said ears in any suitable manner.

The upper edges of the two sides 12 and 13 of case A are formed with outwardly turned flanges 19 and 20 which serve as guides for slidably supporting a closure 21 for the case. The closure 21 is constructed with turned over edges 22 which fit about the guides 19 and 20 and which slidably support the cover with respect to the case proper.

Within the case A is disposed a heater B which is preferably operated by electricity. This heater consists of a receptacle 23 having a base 24 and a socket 25. The receptacle 23 is attached to the bottom 17 of the receptacle A through screws 26 which pass jointly through the base 24 and through said bottom. In the socket 25 is screwed a heating element 27 which consists of a grooved plate 28 of refractory material having a coil 29 of resistance wire disposed within the grooves of said plate. The plate 28 is formed with a plug 30 to which the terminals of the heating coil 29 are connected and which may be screwed into the socket 25 of receptacle 23. The receptacle 23 is provided with terminals 31 and 32, by means of which current may be supplied to the heater B as through an electric cord 33, best shown in Figs. 3 and 4, said cord passing through a bushing 34 in the rear wall 11 in the case A. When the cord 33 is connected to a suitable source of electrical energy, the heating coil 29 becomes incandescent and the heat thereof may be ultilized to light the charcoal as will be presently explained in detail.

The charcoal used with my invention is illustrated in detail in Fig. 5 and is indicated at C. Charcoal as ordinarily furnished for the purpose may be either rectangular or circular in form, and is usually of uniform thickness. In use, a portion of the charcoal is broken off and lighted to cause the burning of the incense, one such portion being shown in Fig. 3 and indicated at 37. This piece of charcoal is held immediately above the heater B so that the heat from the heating coil 29 may light the same.

For supporting the charcoal 37, a tray 38 is employed, which is best shown in Figs. 2, 3 and 4. This tray is constructed principally of woven wire cloth and is formed with a bottom 39, sides 40 and an end 41, the bottom being of an area large enough to receive an entire block of charcoal such as illustrated at C in Fig. 5. The end and sides of the tray being of a height approximately equal to the thickness of the charcoal used. The tray 38 may be constructed in any suitable manner and is provided with an imperforate end member 42 opposite the end 41 which serves as a closure for said end of the tray. A knob 43 is attached to the closure 42, by means of which the tray may be handled and moved into and out of position above the heater B. The tray 38 is adapted to be inserted through an opening 44 in the end wall 10 of case A, and is slidably supported on two guides 45 and 46 attached to the inner surfaces of the side walls 12 and 13 of said case. These guides are formed with grooves 47 along which tray 38 is slidable and which are so disposed that the bottom 39 of the tray is supported immediately above the heating coil 29.

When the tray 38 is inserted into case A through the opening 44 and run along the guides 45 and 46 to the position shown in Figs. 3 and 4, the piece of charcoal 37, carried by said tray, is brought immediately above the heater B and is caused to become ignited when the current is turned on and the coil 29 brought up to incandescence. When the tray 38 is in such position, closure 42 closes the opening 44, in case A, thereby conserving the heat and causing the rapid lighting of the charcoal. In order to procure sufficient ventilation so that the charcoal may burn, the cover 21 and the sides 12 and 13 of the case are formed with perforations 48, which allow fresh air to enter the case and the products of combustion occasioned by the combustion of the charcoal to leave the same.

In the use of the invention, it is merely necessary to place a piece of charcoal such as indicated at 37 in the tray 38 and to insert said tray through the opening 44 and slide the tray along the guides 45 and 46. When the tray is completely inserted into the case and the current turned on, the heat therefrom lights the charcoal which may be removed from the case while supported in the tray and placed into the censer, together with the incense to be burned. The tray may then be replaced and the operation repeated whenever desired.

The advantages of my invention are manifest. An extremely safe and convenient device is provided whereby charcoal may be readily lighted without the accompanying risks occurring when an open flame is employed. The device is positive in action and fool proof so that the same cannot be misused to cause injury to property or person. The heater being entirely encased, the sparks arising in the lighting of the charcoal are confined within the case and fires prevented. Also all charcoal dust which may be discharged from the charcoal during the ignition thereof is retained within the case so that when the lighted charcoal is removed therefrom, little danger of fire occurs.

Changes in the specific form of my invention as herein disclosed may be made within the scope of what is claimed, without departing from the spirit of my invention.

Having described my invention, what I claim as new and desire to protect by Letters Patent is:

A charcoal lighter comprising a case open at the top and bottom and having side and end walls, one of said end walls being formed with an opening therein, a bottom inset within said case, an electric heating element carried by said bottom, guides secured to the sides of said case and in proximity to said opening, a tray slidable along said guides and through said opening, said tray having a perforate bottom adapted to be moved into heat conducting relation with respect to said heating element when disposed within said case, said case having other openings therein for supplying the charcoal with air and for removing the products of combustion therefrom, and a closure for the top of said case, said closure being movable in a manner to expose said tray and heating element.

WILLIAM F. GELSDORF.